Nov. 19, 1968  E. S. WEGMAN  3,411,311

ROOM AIR CONDITIONER CONTROL ARRANGEMENT

Filed Feb. 27, 1967  2 Sheets-Sheet 1

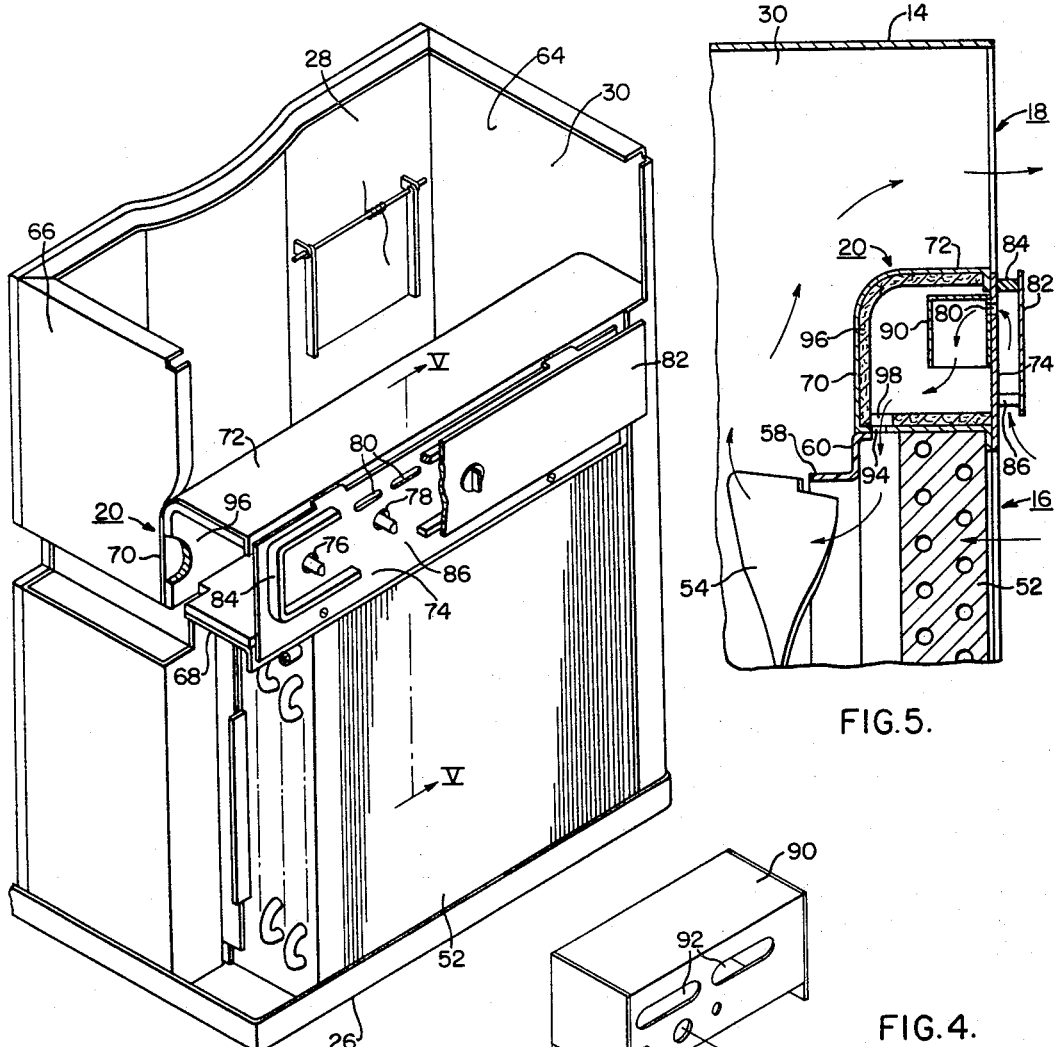
FIG.3.
FIG.5.
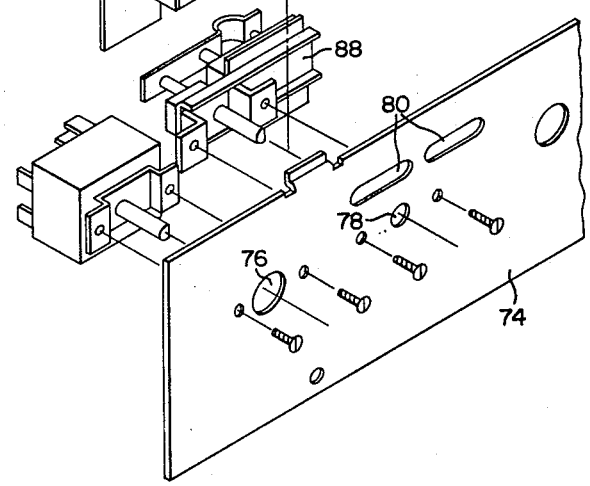
FIG.4.

3,411,311
ROOM AIR CONDITIONER CONTROL ARRANGEMENT

Evert S. Wegman, Columbus, Ohio, assignor to Westinghouse Electric Corporation, Pittsburgh, Pa., a corporation of Pennsylvania
Filed Feb. 27, 1967, Ser. No. 618,639
6 Claims. (Cl. 62—180)

ABSTRACT OF THE DISCLOSURE

Room air conditioner apparatus having a temperature control system of the character responsive to a stream of bypass air with the control chamber containing the temperature responsive control located between the recirculation air inlet and outlet in a position so that the sweep of the recirculation air past the chamber influences the temperature control in an anticipatory fashion.

Cross-reference to related application

Copending Metcalfe U.S. patent application S.N. 618,640 entitled "Window Mount Room Air Conditioner," filed simultaneously herewith on Feb. 27, 1967, discloses an air conditioner having a structural arrangement particularly adapting it for use in horizontal slider windows and providing one environment, for example, in which the present invention may be incorporated.

Background of the invention

*Field of the invention.*—This invention pertains generally to the art of room air conditioner temperature control and particularly to a temperature control arrangement in which the control is responsive to the stream of bypass air.

*Description of the prior art*

Kelly U.S. Patent 3,293,875 discloses a room air conditioner arrangement in which a minor portion of the room air recirculated bypasses the air conditioner evaporator and is directed across a temperature responsive bimetallic element located in a control chamber spaced from the end of the evaporator and in a position generally shielded from effects of variations in the recirculating air temperature so that the element is responsive substantially solely to the temperature of the bypass air stream thereacross.

Summary of the invention

This invention differs from the Kelly approach to temperature control by using temperature variations of the recirculating air to advantage through letting the variations influence the control in a fashion effectively reducing the control differential. To that end, I locate my control chamber immediately between the room air inlet and control air outlet and make it generally coextensive in width therewith so that substantial wall portions of the control chamber are swept by the recirculation air. Thus the variations in temperature of the recirculation air influence the operation of the sensing element within the chamber in a manner that the temperature differential of the element is effectively reduced.

The general mode of operation giving such a result is as follows. As the recirculating air cooled by the evaporator sweeps past the exposed wall portions of the control chamber, air within the chamber is cooled. The control element in the chamber responds both to the entering temperature of the bypass air and to the temperature of the air within the chamber. Thus the compressor is stopped before the temperature of the entering bypass air is depressed to the lower value of the element differential. Conversely, during the compressor off period, the recirculating air picks up heat from wall surfaces of the housing exposed to outside ambient temperatures on one face, and partially defining the recirculation air path on the other face, and this heat is partly transferred to the air in the control chamber to effect starting of the compressor before the temperature of the entering bypass air is elevated to the upper value of the element differential. Thus, the room air is held more closely to a given temperature spread than if the bypass air for control were not influenced by the temperature of the recirculating air sweeping by the control chamber. Thus the invention lends itself admirably to the use of bimetallic temperature control elements having somewhat wider temperature differentials than the more expensive fluid filled bulb elements.

*Drawing description of the preferred embodiment*

FIG. 3 is a fragmentary isometric view illustrating the general arrangement of parts in the room-side space of the air conditioner;

FIG. 4 is an exploded view of selected parts of the control chamber; and

FIG. 5 is a fragmentary vertical sectional view corresponding to one taken along the line V—V of FIG. 3.

Figure 1:
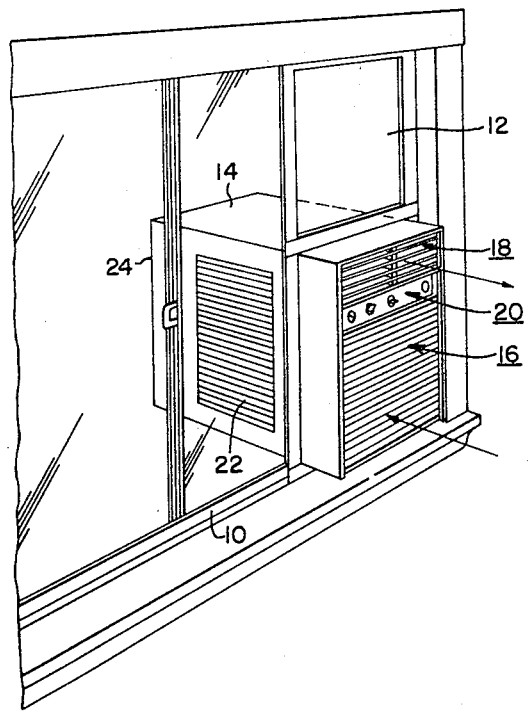
FIGURE 1 is an isometric view of an air conditioner incorporating the invention installed in a horizontal slider window.

FIGURE 1 shows an air conditioner incorporating the invention installed in a slider window environment with one slider sash 10 abutting the side of the air conditioner housing, and the space 12 above the unit blocked by a slide-up-frame. As shown, the major portion of the housing 14 projects outside the window, while a minor portion projects into the room. The inside end face of the unit receives room air through the lower portion inlet 16 and conditioned air is discharged back into the room through the upper portion outlet 18. The control chamber 20 according to the invention is disposed between the inlet and outlet. Details of its arrangement and parts will be considered hereinafter. Condenser air is drawn into the outside portion of the housing through opposite side louvers 22 and is discharged back into the atmosphere after passing through the condenser at the outer end face 24.

Figure 2:
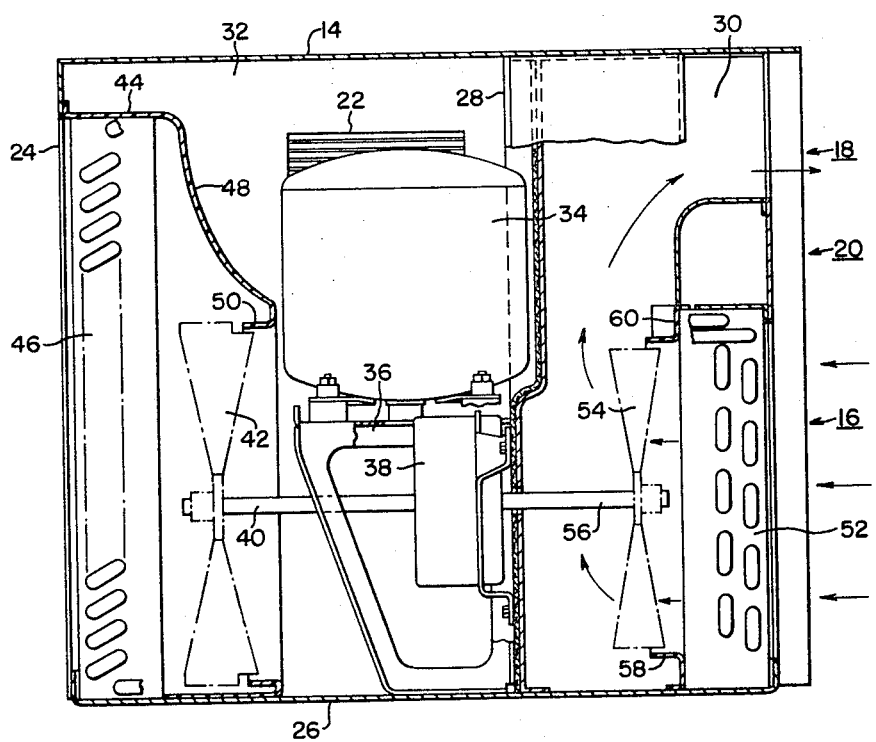
FIG. 2 is a partly-broken side view, including selected parts in vertical section, of the air conditioner of FIG. 1.

The general interior arrangement and locational relationship of the parts of the air conditioner incorporating the invention is best shown in FIG. 2. The base 26 is coextensive with the width and depth of the air conditioner. An upright bulkhead 28 separates the interior of the unit into a room-side space 30 and an outside-side space 32.

The outside-side space 32 contains the usual refrigeration system components but specially located in accordance with the disclosure of the noted Metcalfe patent application. These members include the refrigerant compressor 34 mounted upon the compressor bracket 36 secured to the bulkhead 28, a fan motor 38 secured to the bulkhead in the space between the bracket and the base pan 26 with one end shaft 40 projecting outwardly and carrying a condenser fan 42 disposed in a fan ring 50. The fan ring is an integral part of a shroud structure which includes an intermediate transition portion 48 terminating in a rim and top portion 44 which attaches to the condenser 46.

The main parts of the arrangement found in the room-side space 30 includes the evaporator 52 which is generally coextensive with the room air inlet 16 at the inner end face of the unit, the room air fan 54 mounted on the fan motor end shaft 56 which projects inwardly through the upright bulkhead 28 and into the room-side space, and the control chamber 20 located closely above the upper edge of the evaporator with the top face of the chamber defining the lower boundary of the passage to the air outlet 18.

The fan 54 is centered in a fan ring 58 which is formed as a part of the generally upright wall 60 rearwardly spaced from the evaporator 52 with its perimetric edges connected to the evaporator edges to form a plenum directing the recirculating air which has passed through the evaporator to the fan ring. The air then flows up through the room-side space and out of the outlet 18 as indicated by the directional arrows in FIG. 2.

As shown in FIG. 3, the upright bulkhead 28 which separates the outside-side space and room-side space includes forwardly-projecting wings 64 and 66 on opposite sides of the room-side space. These wings generally define the side boundaries for the passage of recirculating air and, as in the case of the separating bulkhead 28, tend to be warmed by ambient air outside of the conditioned room.

The control chamber 20 extends horizontally for substantially the width of the inner end face of the air conditioning unit, and includes a forwardly-open shell which is U-shaped in transverse cross-section, and a front cover plate. As shown in FIG. 3, the shell includes a bottom wall 68, a rear wall 70, and a top wall 72. The cover plate 74 which substantially closes the open front face of the shell has openings 76 and 78 accommodating the forwardly projecting shafts of control elements housed within the chamber, and also includes a pair of slots 80 which serve as the inlets in the cover plate for the flow of bypass air into the chamber. A substantially flat escutcheon plate 82 overlies the front face of the cover plate 74 and is held there by the knobs for the controls. Operating indicia on the plate guides the user of the air conditioner. The rear face of the escutcheon plate carries a gasket 84 which extends adjacent the periphery of the plate except for a gap 86 in the gasket directly below the inlet openings 80 in the cover plate. The gasket prevents the admission of bypass room air except through the gap, and thereby avoids the discharge air from the outlet 18 short circuiting back into the control chamber.

FIG. 4 illustrates a portion of the cover plate 74 with the parts of particular concern in connection with this invention in exploded relation before attachment to the cover plate. The bimetallic thermostat and switch assembly 88 is attached to the rear face of the cover plate with the temperature adjusting shaft therefor projecting through the opening 78 in the cover plate. The assembly 88 may be housed within a fish paper enclosure 90 which has slots 92 registering with the slots 80 in the cover plate. The bottom face of the enclosure 90 is open to permit the bypass air to exit therefrom and then pass through slots 94 (FIG. 5) in the bottom wall 68 of the shell. The bimetallic switch assembly 84 and fish paper enclosure 90 are of generally the same character as those disclosed in the noted Kelly patent.

The general path of the stream of bypass air through the control chamber and the room-side space of the unit is best shown in FIG. 5, with the thermostat omitted for clarity. The main stream of room air is drawn through the inlet 16 and evaporator 52 by the fan 54, while a very minor part of the room air bypasses the evaporator by flowing up behind the escutcheon plate 82 through the gap 86 in the peripheral gasket 84, then up through the slots 80 of the cover plate and slots 92 of the enclosure 90, past the thermostat (not shown) in the enclosure, and then out of the control chamber through the slot 94 in the shell bottom wall 68 to the plenum between the evaporator and the wall 60. There the bypass air stream joins the main air stream and both are forced by the fan 54 up through the room-side space.

Part of this total flow sweeps past the rear wall 70 and top wall 72 of the shell on its way to the discharge outlet 18. The flow of course also sweeps the other boundaries defining the passage between the fan and outlet.

It is noted that FIGS. 3 and 5 show an interior liner 96 within the control chamber shell. The liner is also U-shaped in transverse section to conform to the shape of the inner face of the shell. This liner is provided principally for avoiding condensation upon the interior faces of the shell. As such it does not have great thermal insulating capacity and therefore does not prevent the air temperature within the chamber from being influenced by variations in shell wall temperature. Of course, the liner 96 is provided with an opening 98 in its bottom registering with the opening 94 in the bottom wall of the shell to permit the exit of air from the control chamber.

The operation of the temperature control corresponds generally to that set forth in the noted Kelly patent. The desired room temperature is set by adjusting the bimetallic elements and switch assembly to a given position corresponding to a desired temperature level. If it is assumed that the assembly has a differential of, say, 6° F., and it is desired that the room temperature be maintained at about 75° F., then the switch is opened to stop compressor operation when the bimetallic element senses a temperature below 72°, and the switch is closed when the element senses a temperature above 78° F. First assume the air conditioner is operating to cool the room by discharging cold air into the room. As the cooling cycle proceeds, the cold air flowing up through the room-side space will chill the walls of the control chamber shell so that the air within the chamber is also cooled slightly. While the temperature of the entering bypass air exerts, by far, the greatest influence upon the bimetallic elements (by virtue of its disposition directly with the path of the bypass air), the influence of the substantially colder, somewhat static, air in the chamber will cause the element to open the switch controlling the compressor before the temperature of the entering bypass air reaches the lower limit of its differential. Thus, the switch may open upon sensing 72° F., even though the entering bypass air is at 73° F.

Now with the compressor off and the room air fan continuing to run, the room air entering the room-side space and circulating therethrough will tend to warm the evaporator to the same temperature as the room. If it is assumed that the outside temperature is substantially higher than the room temperature (thereby creating the need for operation of the air conditioner), it will be appreciated that the bulkhead 28 with its side wing portions 64 and 66, which help define the passage for the flow of recirculating room air, will tend to warm this air. Accordingly, this air which is somewhat warmer than the room air temperature will warm the control chamber wall and air therein. Thus the bimetallic element is subject to sensing the upper value (78°) of its differential before entering room air reaches that temperature. Hence the demand of the room for cooling, and the cessation of cooling, is anticipated with an arrangement according to the invention.

It will be appreciated that the degree of anticipation varies in accordance with environmental factors. Thus, it will normally be expected that a greater anticipatory effect will occur during a cooling operation than a recirculation period. However, where the outside temperature is relatively high and the air conditioner is exposed to a heavy sun load greater anticipation may occur during a recirculation period.

I claim as my invention:

1. In a room air conditioner of the type in which temperature control is effected by controlling compressor operation in response to variations in temperature experienced by a temperature sensing element disposed in the path of a stream of room air bypassing the air conditioner evaporator, an arrangement of parts of the room-side portion of the conditioner, comprising:

means defining an end face for said room-side portion;
a main room air inlet having said evaporator disposed thereacross, and a conditioned air outlet, in said end face, said inlet and outlet being separated from each other to provide a space directly therebetween;

means defining a flow passage between said inlet and outlet in said room-side portion;

said defining means including wall means having portions thereof subject to exchanging heat with the atmosphere exterior of the room being conditioned;

a control chamber containing said temperature sensing element in said space between said inlet and outlet, said chamber having a length substantially coextensive with the dimensions of said inlet and outlet parallel to said length, and having wall portions of substantially said length defining a part of said flow passage in said room-side space so that the flow of air through said passage sweeps past sufficient surface of said chamber wall portions to materially influence the air temperature in said chamber in accordance with temperature variations of said air flow and thereby impose an anticipatory effect upon the operation of said temperature sensing element in said chamber.

2. In an air conditioner according to claim 1:

said end face includes said main room air inlet, said control chamber, and said conditioned air outlet at successively higher levels with each being generally coextensive with the width of said end face.

3. In an air conditioner according to claim 2:

said control chamber comprises an elongate, horizontally-disposed shell including a bottom wall generally overlying the top edge of said evaporator, with said passage-defining wall portions of said shell being the rear and top walls thereof.

4. In an air conditioner according to claim 2 including:

inlet means for said bypassing stream of air disposed to admit room air drawn upwardly from directly in front of said main room air inlet so that short-circuiting of air from said conditioned air outlet is substantially avoided.

5. In combination with a room air conditioner having a room-side space through which room air is circulated to be conditioned, a locational arrangement of room-side space components comprising:

a main room air inlet occupying substantially the width of the lower portion of the room-end face of said air conditioner, said inlet having a refrigerant evaporator disposed thereacross;

a conditioned air outlet occupying substantially the width of the upper portion of said room-side face of said air conditioner, the lower boundary of said outlet being spaced above and apart from the upper boundary of said main air inlet;

fan means for circulating air through said room-side space;

a control chamber located in the space between said inlet and outlet and extending for substantially the width of said air conditioner, said chamber including a bottom wall overlying the top edge of said evaporator and rear and top wall means extending upwardly and forwardly to said lower boundary of conditioned air outlet;

bypass air inlet means for admitting a bypass stream of room air into said chamber;

bypass air outlet means for discharging said bypass stream from said chamber to the downstream side of said evaporator; and temperature responsive means in said control chamber in the path of said bypass stream for controlling the operation of said air conditioner in accordance with temperature variations sensed by said temperature responsive means reflecting both changes in temperature of said entering bypass stream and changes in air temperature in said chamber influenced by the air temperature of said circulating air sweeping by said wall means of said control chamber.

6. A room air conditioner comprising:

a housing including wall means separating the interior thereof into an outside-side space and a room-side space;

a refrigerating system including compressor and condenser means in said outside-side space, and an evaporator in said room-side space;

said room-side space including an end face having a lower air inlet with said evaporator disposed thereacross, and an upper conditioned air outlet, both said inlet and outlet extending across substantially the width of said end face;

means for circulating air through said room-side space;

means defining a control chamber shell directly between said inlet and outlet and extending across substantially the width of said end face with at least the rear and top wall portions of said shell exposed to reflect changes in the temperature of said recirculating air sweeping by said wall portions of said shell;

means defining a bypass air inlet and a bypass air outlet in said control chamber for a stream of room air through said chamber bypassing said evaporator;

temperature responsive control switch means disposed in said control chamber in the path of said bypass air stream for controlling said compressor operation in accordance with temperature variations in said chamber;

said separating wall means in said housing being sufficiently exposed on one face to ambient temperatures exterior of said room so that said recirculating air is subject to being warmed by said separating wall means when said refrigerating system is off;

whereby an anticipating effect is normally exercised upon said temperature responsive control switch means through cooling said control chamber shell by the sweep of evaporator cooled air when said refrigerating system is operating, and warming said shell by the sweep of said recirculating air receiving heat from said separating wall means when said refrigerating system is off.

References Cited

UNITED STATES PATENTS

| | | | |
|---|---|---|---|
| 2,165,831 | 7/1939 | Aulsebrook | 62—180 |
| 2,432,587 | 12/1947 | Ramsey | 62—229 |
| 3,194,027 | 7/1965 | Prendergast | 62—180 |

WILLIAM J. WYE, *Primary Examiner.*